United States Patent [19]

Sherman

[11] Patent Number: 4,774,722
[45] Date of Patent: Sep. 27, 1988

[54] TELEPHONE LINE ACTIVITY MONITORING METHOD AND DEVICE

[75] Inventor: Larry J. Sherman, Chatworth, Calif.

[73] Assignee: The Sherman Electronics Corporation, Chicago, Ill.

[21] Appl. No.: 62,206

[22] Filed: Jun. 15, 1987

[51] Int. Cl.⁴ ............................................. H04M 1/24
[52] U.S. Cl. ...................................... 379/27; 379/34; 379/140
[58] Field of Search ...................... 379/27, 22, 26, 32, 379/33, 34, 111, 140

[56] References Cited

U.S. PATENT DOCUMENTS 4,429,184  1/1984  Holm et al. ............................ 379/32
4,679,224  7/1987  Lynch et al. .......................... 379/26

Primary Examiner—Stafford D. Schreyer
Attorney, Agent, or Firm—Olson & Hierl

[57] ABSTRACT

A telephone line activity monitor which monitors telephone line activity as a function of a time interval is disclosed. The device and method of the present invention include detecting activity on a telephone line, counting time intervals, comparing whether telephone line activity occurred during a predetermined number of time intervals, and indicating when no telephone line activity has occurred during the predetermined number of time intervals.

25 Claims, 5 Drawing Sheets

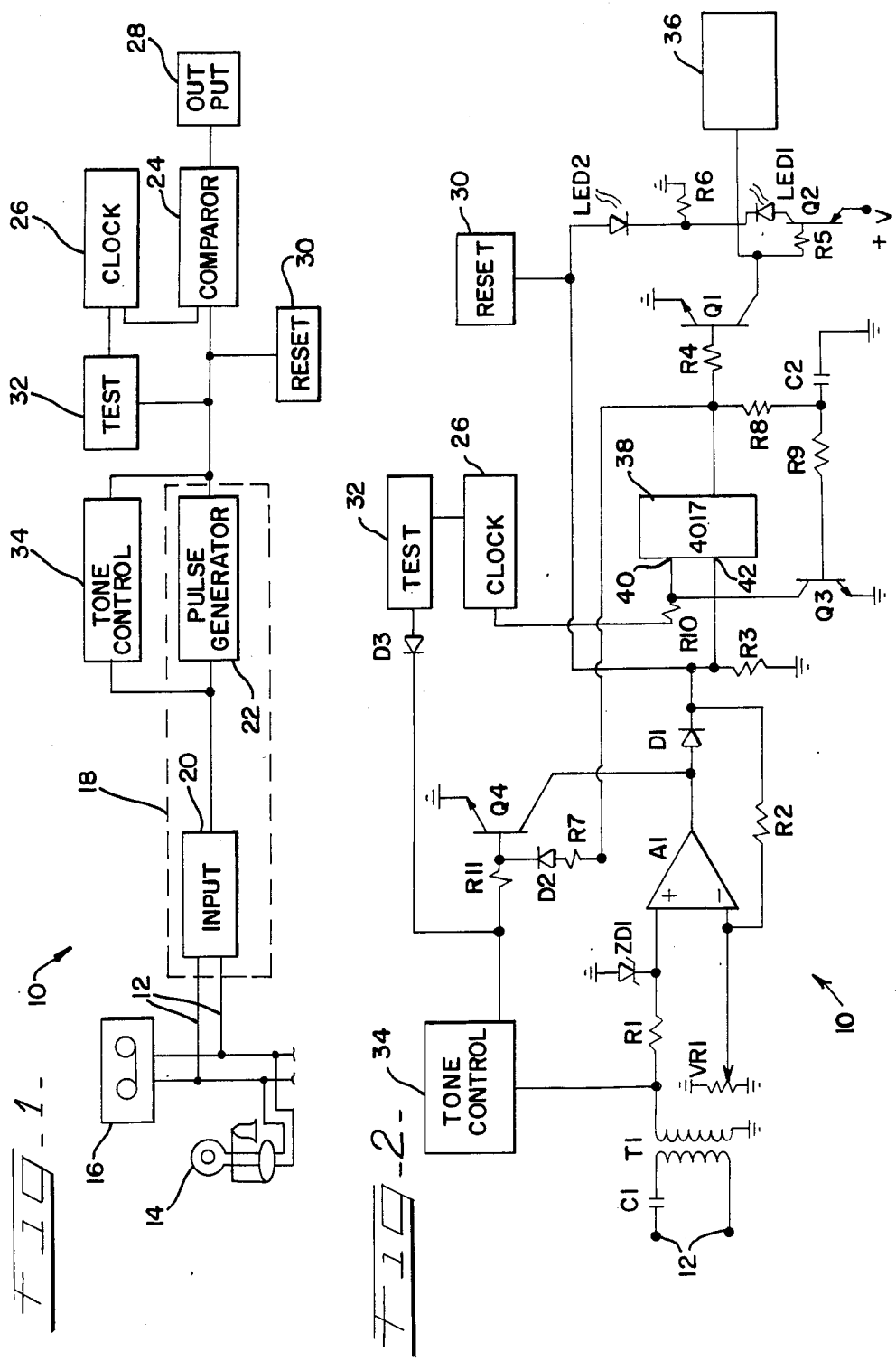

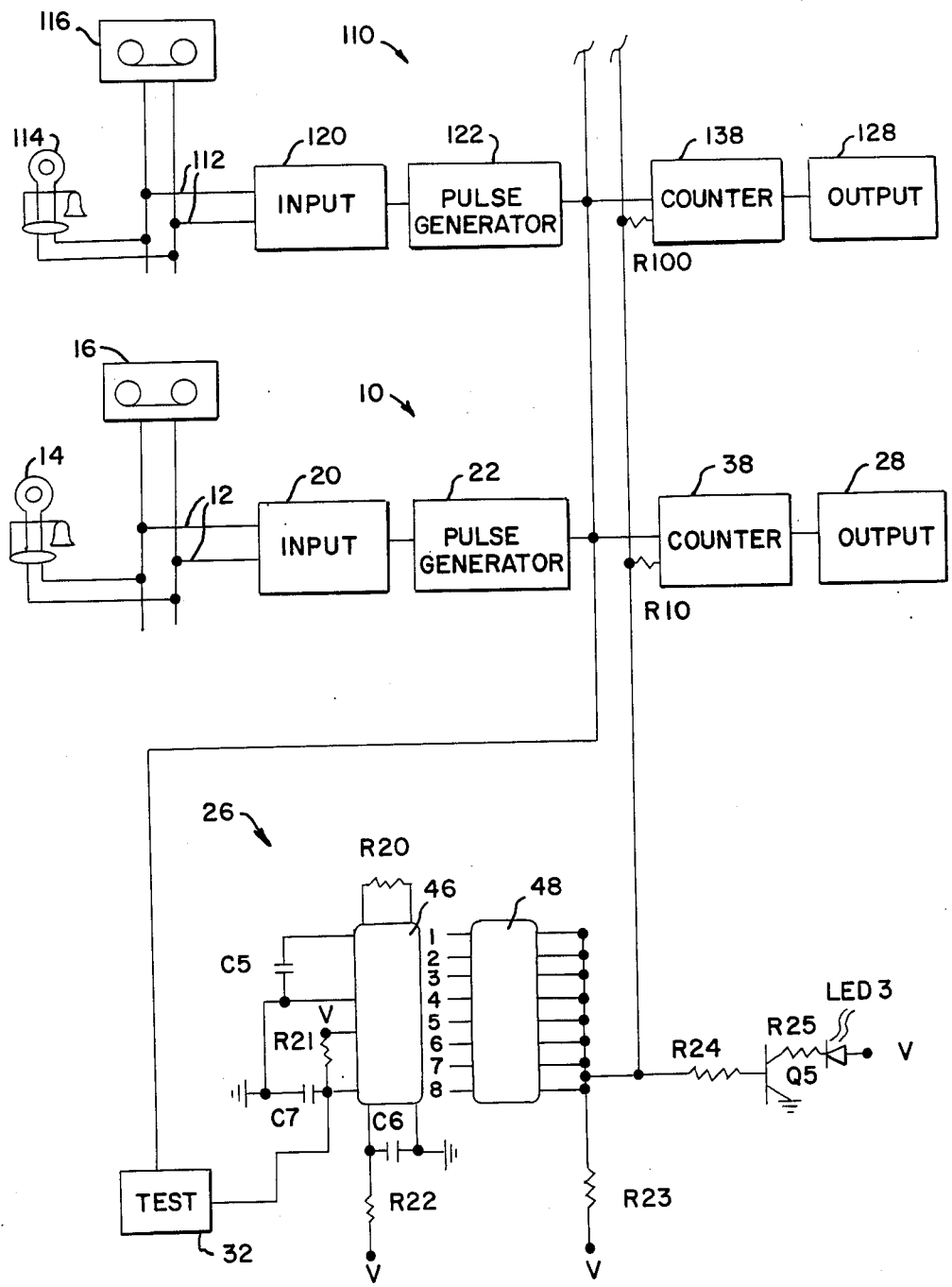

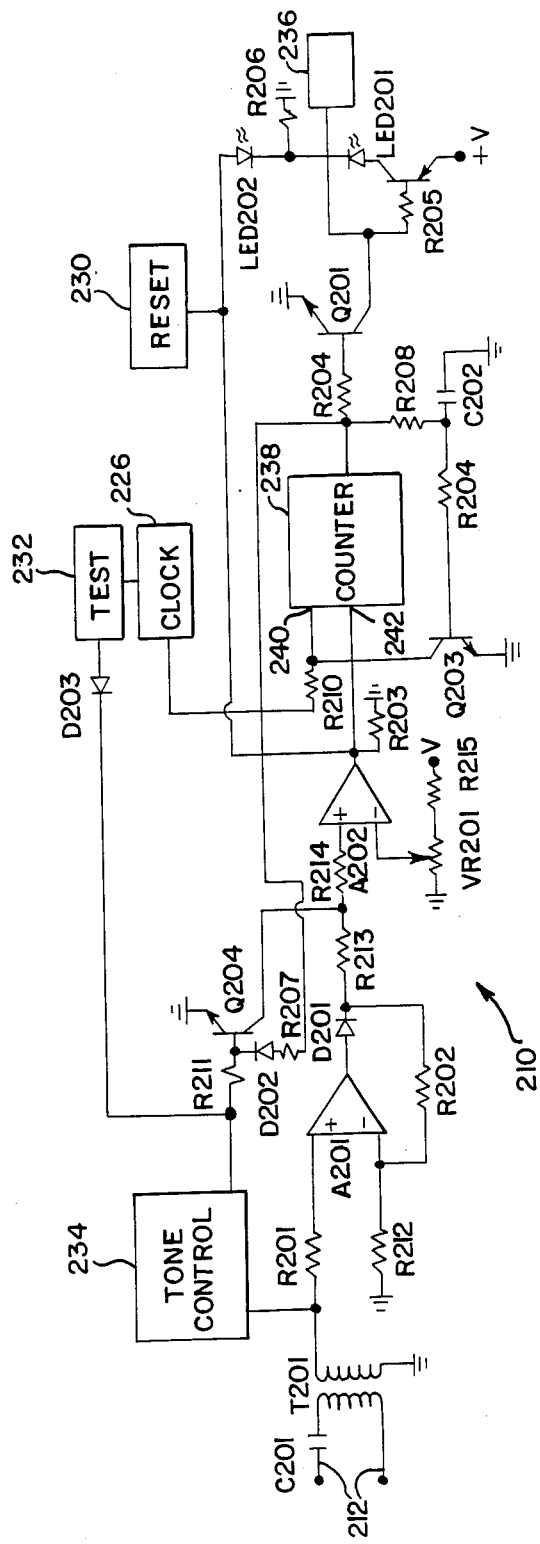

TELEPHONE LINE ACTIVITY MONITORING METHOD AND DEVICE

FIELD OF THE INVENTION

This invention relates to telephone line monitoring circuits and in particular to monitoring telephone line activity as a function of a time interval.

BACKGROUND OF THE INVENTION

Telephone communications have become vital in today's society. Reliance on the dissimilation of information over the telephone has increased and will continue to increase. Several occupations, such as stock brokering, fire protection and police protection depend on receiving communications over the telephone. Still other services, such as home food delivery, rely solely on telephone communications for their very existence.

While receiving orders for services over a telephone is fast, it lacks the physical record of an order received on paper. To solve this problem, recording devices such as multichannel recorders which can record up to 56 voice communications at the same time are used. For example, police or fire departments use such recordings to show when a report was received and from whom. Stock brokers also rely on the telephone to receive and record phone orders.

While such recorders often provide for checking the integrity of the recording device itself, there is no provision to insure that the recorder remains properly connected to the telephone line. In addition, because such recording devices are attached to the telephone line in parallel with the telephone, the telephone will continue to operate even if there is a failure in the recording circuit. Thus, there is no immediate warning of a problem.

Because of the importance of the information recorded in these circumstances, constant assurance that the recording device is properly connected to the telephone line is needed. While a periodic manual check of the telephone line can be made by the user, this solution has the drawback of unduly occupying the user's time and energy.

Accordingly, what is needed is a device which will identify when there is a problem with the phone line leading to a recording device. Such a device should be able to monitor the activity on the phone line without interfering with the operation of either the telephone or the recording device. The present invention meets these desires.

SUMMARY OF THE INVENTION

The present invention is a device and method for monitoring telephone line activity based on the passing of a test period. Because telephone lines to services such as stock brokers or police and fire departments are in near constant use, lack of activity over a given time period is a good indication of a line failure. When no telephone calls have occurred during the test period a warning signal is provided so that the user can check the system.

The telephone line monitoring device of the present invention includes a clock means that signals the passing of a time interval, a detecting means that is tapped into the telephone line to determine when a telephone call occurs, a comparing means to compare whether a predetermined number of time intervals forming the test period have passed without a telephone call being sensed on the line to recorder, and an output indicator to signal when the predetermined number of time intervals have passed without sensing a telephone call.

A method of monitoring whether a telephone call occurred on a telephone line during the test period is also provided in the present invention. This method includes the steps of detecting telephone activity on a telephone line, measuring time, resetting the time measurement when telephone activity is detected, and signaling when the time measurement exceeds a predetermined interval.

In a preferred embodiment, test means and reset means can be provided. The test means allows the predetermined number of time intervals to pass so that the output indicator signals. This is accomplished by either singularly or in combination preventing telephone call signals from reaching the comparing means so that after the predetermined number of time intervals pass, the output indicator signals or by accelerating the timing intervals so that the predetermined number of time intervals pass without a telephone call. The reset means provides a simulated incoming telephone call signal so that the comparing means resets.

Finally, a tone control can be provided to signal to the telephone user that the call is being recorded.

BRIEF DESCRIPTION OF THE DRAWINGS

FIG. 1 is a block diagram showing the logical progression of the present invention;

FIG. 2 is a schematic of a part of a preferred embodiment of the present invention;

FIG. 3 is a detailed schematic of the clock means of a preferred embodiment of the present invention;

FIG. 6 is a schematic of a second preferred embodiment of the present invention.

DETAILED DESCRIPTION OF A PREFERRED EMBODIMENT

Figure 4:
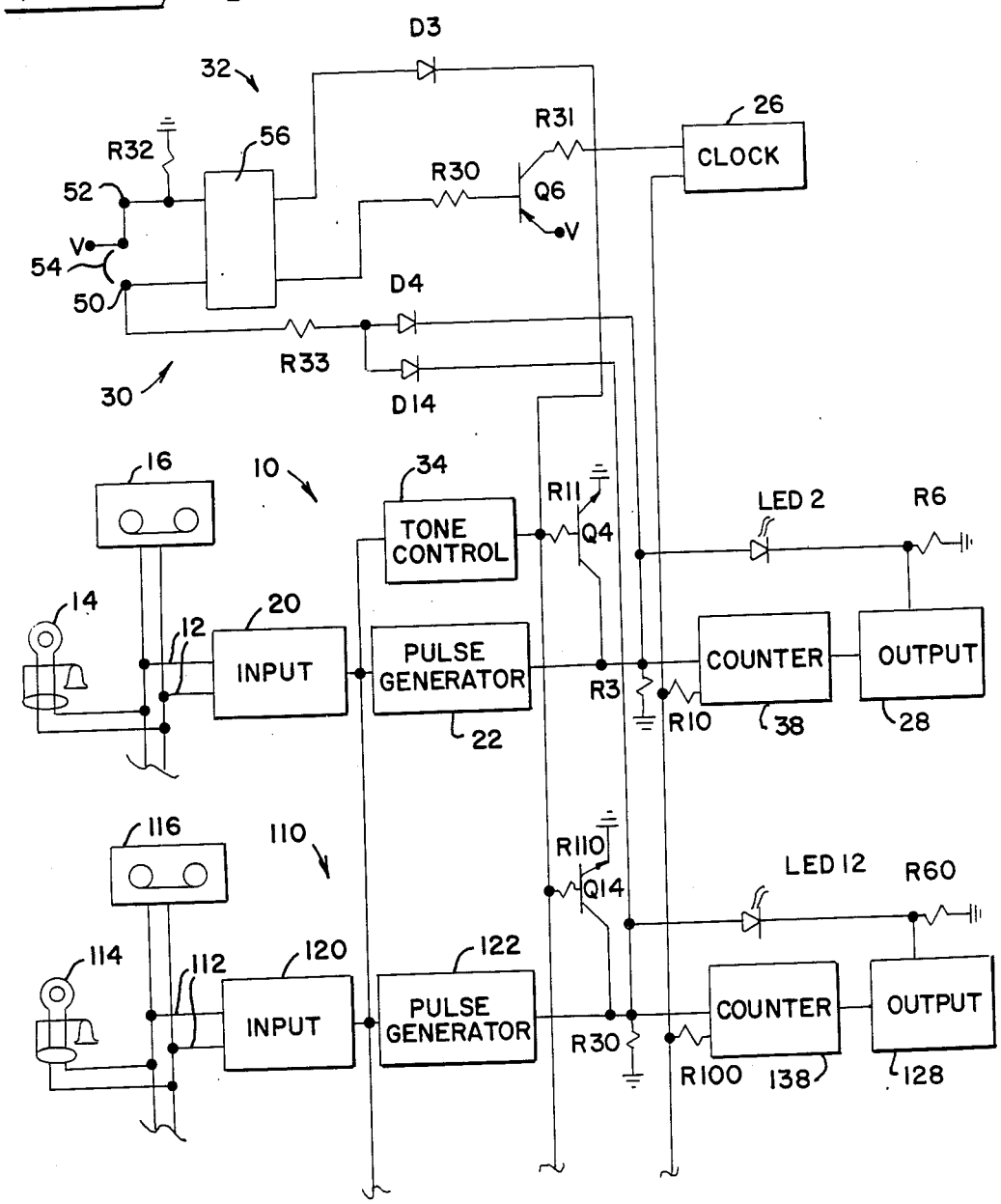
FIG. 4 is a detailed schematic of the test means and reset means of a preferred embodiment of the present invention.

Referring to FIG. 1, the telephone line monitoring device is shown generally at 10. Means for detecting telephone calls is shown generally at 18. The detecting means 18 is in electronic communication with a telephone line 12. The telephone line 12 can either connect a telephone receiver 14 to outside telephones or connect the telephone receiver 14 to a recording machine 16, as is shown in FIG. 1.

When a telephone call is transmitted over the telephone line 12, the detection means 18 communicates to comparing means 24 that a telephone call has occurred. The comparing means 24 is also in communication with clock means 26 which generates timing signals at predetermined intervals. A predetermined number of intervals make up a test period. Thus, the clock means 26 and the comparing means 24 together serve as a means for measuring the time for the test period. For example, the time interval of the clock means 26 can be set at one half hour and the number of intervals set at four. The test period is then two hours.

The comparing means 24 receives timing signals from the clock means 26. When there is telephone line activity, the comparing means 24 is reset. If the comparing means 24 does not receive a signal from the detecting means 18 before the predetermined number of time intervals has passed, the comparing means 24 activates an output indicator 28. This informs the user that no telephone line 12 activity occurred in the test period and the telephone line 12 should be checked.

In the example above, if there is no telephone line activity e.g. no telephone call for a two hour period, the user will be warned that there may be a problem with the telephone line 12. Because the present invention uses a reset function on the comparing means 24, it is not limited to checking use for exact two hour periods. Instead of only testing whether there was telephone line activity for example between 12:00 to 2:00 or 2:00 to 4:00, the present invention looks to whether there was telephone line activity over the last two hours which may be from 12:38 to 2:38. This is important if the telephone line 12 fails at 12:15. The device need not wait until 4:00 to indicate that there is a problem. Adjusting the length of the time interval and the number of intervals making up a test period provides for great flexibility.

In one embodiment, the detecting means 18 can be made up of input means 20 and a pulse generator 22. The input means 20 is electronically connected to the telephone line 12 and receives a signal when a telephone call is transmitted over the telephone line 12. This signal may be due to a ring or sound transmission over the telephone line 12. The pulse generator 22 receives the signal from the input means 20 and generates a pulse corresponding to the telephone line 12 activity. The pulse is then communicated to the comparing means 24. As will be appreciated by one skilled in the art, the detecting means 18 can be made up of other circuitry, such as a Schmitt trigger, an appropriate amplifier, or a multivibrator, which is capable of communicating to the comparing means 24 that a telephone call has occurred.

A tone control 34 is also provided for intermittently signaling to the telephone users that their call is being recorded. The tone control 34 includes a pulse generator override to prevent the comparing means 24 from interpreting the tone as incoming telephone activity.

Reset means 30 are provided for clearing the comparing means 24 after the output signal has been produced. Test means 32 are also provided to test the output indicator 28. In one embodiment, the test means 32 includes means for disabling the detecting means 18 so that the detecting means 18 cannot communicate to the comparing means 24 that a telephone call occurred. In another embodiment, the test means 32 also speeds the clock means 26 to fast count the test period.

The test period can be set by the combination of the length of the time interval generated by the clock means 26 and the number of intervals used to form a test period. The clock means 26 timing signals can be varied for different time intervals. In addition, the number of timing signals from the clock means 26 that the comparing means 24 receives without a telephone call before the output indicator 28 is triggered can be varied.

Referring to FIG. 2, in a preferred embodiment the telephone monitor device is again shown generally at 10. The telephone line 12 is inputted through input means which includes a capacitor C1 to filter out direct current from the telephone line 12, a grounded transformer T1, and a resistor R1, into the non-inverting input of an operational amplifier A1. A zener diode ZD1 also connects the non-inverting input of operational amplifier A1 to ground. The output of operational amplifier A1 is fedback through a diode D1 and a resistor R2 into the inverting input, which is also grounded through a variable resistor VR1. The output of operational amplifier A1 is a pulse which is generated when the activity on the telephone line 12 exceeds the voltage supplied to the inverting input by variable resistor VR1. Thus, operational amplifier A1 acts as a pulse generator 22 in response to a telephone call. Sensitivity is controlled by adjusting VR1.

The comparing means includes a counter 38 having a clock input 40 and a reset input 42. The output of the clock means 26 is inputted through a resistor R10 into the clock input 40 of the counter 38. The pulse output of operational amplifier A1 is inputted through diode D1 into the reset input 42 of the counter 38 which is also grounded through a resistor R3. When a predetermined number of timing signals from the clock means 26 are received by the counter 38 and no pulse is received from amplifier A1, the test period has passed and the counter 38 generates an output signal.

The counter 38 can be a 4017 counter with the output chosen to be the number of clock pulses which make up the test period. In the case of a 4017 counter, pin 10 is the indicator for a count of four pulses and an output signal is generated if four clock pulses are received without any pulse from amplifier A1.

The output signal of the counter 38 is connected through a resistor R4 to the base of a grounded emitter NPN transistor Q1. The collector of transistor Q1 is connected through a resistor R5 to the base of a emitter powered PNP transistor Q2. The collector of transistor Q2 is connected to a light emitting diode LED 1 which is grounded through a resistor R6. When an output signal is generated by the counter 38, the transistors Q1, Q2 act as a switch to light the light emitting diode LED 1, thus acting as an output indicator 28. Alternatively or in series, the output signal from the counter 38 can be connected to means for compiling data 36, such as a recording device or a micro-processor, to tabulate output data.

In an additional preferred embodiment, means for freezing the output indicator 28 when it has signaled is provided. Thus, in the present preferred embodiment, the output signal from the counter 38 is also connected through a series resistor R7 and diode D2 to the base of an emitter grounded NPN transistor Q4. The collector of transistor Q4 is connected to the output of operational amplifier A1. In operation, when the counter output signals, the transistor Q4 grounds the operational amplifier A1 output, preventing further pulse signals from resetting the counter 38.

The counter output is also connected through series resistors R8, R9 to the base of a grounded emitter NPN transistor Q3. A capacitor C2 is connected from the junction of the series resistors R8, R9 to ground. The collector of transistor Q3 is connected to the clock input of the counter 38. Thus, an output signal from the counter 38 bias's transistor Q3 which grounds the clock input 40 of the counter 38 to prevent the counter 38 from receiving further timing signals from the clock means 26. With both the clock input 40 and the reset input 42 of counter 38 grounded, light emitting diode LED 1 can only be reset manually and will not reset in response to telephone activity or clock pulses.

A preferred embodiment of the clock means 26 is shown in FIG. 3. A timer chip 46 is powered through various resistors R20, R21 and R22; capacitors C5, C6 and C7; and power source V of which the use is known to those skilled in the art. The timer chip 46 is also connected to the test means 32 for providing fast counting during testing, as explained in greater detail below. A suitable example for the timer chip 46 is a 2240 integrated chip. The output of the timer chip 46 is connected to a DIP switch 48 so that the time interval can be selected. Different outputs of the timer chip 46 have different timing rates.

The DIP switch 48 output is connected to power source V through a resistor R23 and to the clock input 40 of the counter 38 through a resistor R10. The DIP switch 48 output is also connected to the base of a emitter grounded NPN transistor Q5 through a resistor R24. The collector of transistor Q5 is connected through a resistor R25 to a light emitting diode LED 3 which is connected to a power source V. Thus, transistor Q5 acts as a switch to light the light emitting diode LED 3 in accordance with the DIP switch output to give a visual display of the clock means operation.

In a further embodiment, the output of the clock means 26 can be utilized to drive additional telephone line monitoring devices (shown generally as 110) by continuing the DIP switch 48 output through a resistor R110 corresponding to resistor R10 to an additional counter 138 corresponding to counter 38.

A preferred embodiment of the test means 32 and the reset means 30 is shown in FIG. 4. A toggle switch 50 is provided to enable either the test means 32 or the reset means 30. When the toggle switch 54 is set to test mode 52, a power source V is inputted into a flip-flop 56 and is grounded through a resistor R32. The flip-flop 56 high output is inputted through a diode D3 and resistor R11 into the transistor Q4 of the operational amplifier A1 output pulse grounding circuitry.

The flip-flop 56 low output is connected through a resistor R30 to the base of an emitter powered PNP transistor Q6. The collector of transistor Q6 is connected through a resistor R31 to the clock means 26 timer chip 46. In operation, the input of power by the toggle switch 54 into the flip-flop 56 causes the flip-flop 56 high output to go high which bias's transistor Q4 grounding operational amplifier A1 pulse output. The flip-flop 56 low output bias's transistor Q6 thereby supplying an additional power supply to the clock means 26 timer chip 46 for fast counting. The grounded pulse output allows the fast counting to signal to the counter 38 that the test period has passed, and the output signal is lit.

When the toggle switch 54 is set to reset mode 50, power source V is supplied through a series resistor R33 and diode D4 into the counter 38 reset input 42 to simulate a telephone call pulse to reset the counter 38. The counter 38 input is also grounded through a light emitting diode LED 2 and a resistor R6 to signal reset. The power source V is also inputted into the flip-flop 56 reset to terminate the test mode 52, if set.

As with the clock means 26, in a further embodiment both the test means 32 and the reset means 30 can be utilized to drive additional telephone line monitoring devices (shown generally as 110). An additional amplifier corresponding to operational amplifier A1 can be grounded through corresponding output pulse grounding circuitry connected to flip-flop 56 output. Likewise, an additional diode D14 corresponding to diode D4 can be provided to connect the reset means 30 to an additional counter 138 corresponding to counter 38 to reset additional telephone line monitors 110.

Figure 5:
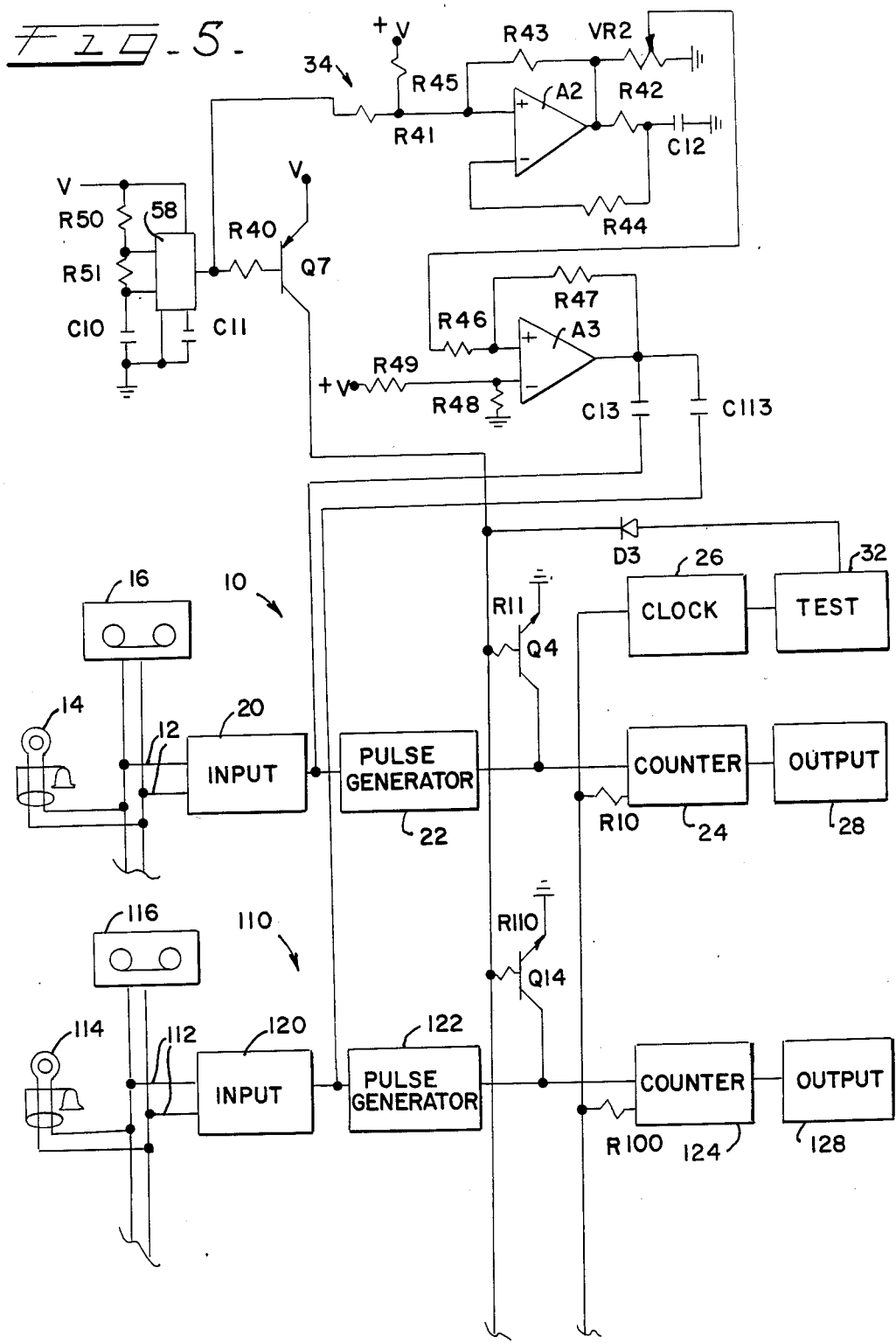
FIG. 5 is a detailed schematic of the tone control of a preferred embodiment of the present invention.

A preferred embodiment of the tone control 34 is shown in FIG. 5. A timer chip 58 is powered through various resistors R50, R51; capacitors C10, C11; and a power source V of which the use is known in the art. A suitable example for this timer chip is a 555 integrated chip. The output of the timer chip 58 is connected to the base of an emitter powered PNP transistor Q7 through a resistor R40. The collector of transistor Q7 is connected through resistor R11 to the transistor Q4 of the operational amplifier A1 output pulse grounding circuitry.

The output of the timer chip 58 is also inputted through a resistor R41 into the non-inverting input of an operational amplifier A2. A power source V is also inputted through a resistor R45 into the non-inverting input. The output of operational amplifier A2 is fedback into the non-inverting input through a resistor R43 and is fedback into the inverting input through two series resistors R42, R44 with the junction of the two series resistors R42, R44 grounded through a capacitor C12.

The output of operational amplifier A2 is also inputted through a variable resistor VR2 and series resistor R46 into the inverting input of a second operational amplifier A3. The non-inverting input of operational amplifier A3 is connected to a power source V through a resistor R49 and to ground through a second resistor R48. The output of operational amplifier A3 is fedback into the inverting input through a resistor R47 and is connected to the input transformer T1 through a capacitor C13.

In operation, the output from the timer chip 58 is amplified through operational amplifiers A2, A3 and inputted into the input transformer T1. The input transformer T1 allows this signal back onto the telephone line 12 to signal to the users that the call is being recorded.

To prevent this tone signal from resetting the counter 38, means for intermittently disabling the detecting means at times corresponding to the intermittent on-line tone is provided. Thus, the timer chip 58 output also acts to bias transistor Q7, thereby sending a signal to bias transistor Q4 which grounds operational amplifier A1 pulse output. When the tone signal passes, the ground is removed to allow normal operation.

As with the clock means 26, reset means 30, and test means 32, in a further embodiment the tone control 34 can be utilized to drive additional telephone line monitoring devices (shown generally as 110). An additional capacitor C113 corresponding to capacitor C13 is provided to input operational amplifier A3 output into an additional transformer corresponding to transformer T1. An additional resistor R110 corresponding to resistor R11 is provided to connect the collector of transistor Q7 to additional monitor pulse grounding circuitry.

Referring to FIG. 6, in a second preferred embodiment, the telephone monitor device is again shown generally at 210. The input means again includes a capacitor C201 to filter out direct current from the telephone line 212, a grounded transformer T201, and a resistor R201. The telephone activity is inputted from the input means into the non-inverting input of an operational amplifier A201. The output of operational amplifier A201 is fedback through a diode D201 and a resistor R202 into its inverting input, which is also grounded through a resistor R212.

The output of amplifier A201 is also inputted through diode D201 and two resistors in series R213, R214 into the non-inverting input of a second operational amplifier A202. A power source V is inputted into the inverting input of amplifier A202 through a variable resistor VR201 in series with a resistor R215. The output of amplifier A202 is a pulse which is generated when there is activity on the telephone line 212. Thus, amplifiers A201, A202 act as a pulse generator in response to a telephone call.

The comparing means includes a counter 238 having a clock input 240 and a reset input 242. The output of the clock means 226 is inputted through a resistor R210 into the clock input 240 of the counter 238. The pulse output of amplifier A202 is inputted into the reset input 242 of the counter 238. When a predetermined number of timing signals from the clock means 226 are received by the counter 238 and no pulse is received from amplifier A202, the test period has passed and the counter 238 generates an output signal.

The output signal of the counter 238 is connected through a resistor R204 to the base of a grounded emitter NPN transistor Q201. The collector of transistor Q201 is connected through a resistor R205 to the base of an emitter powered PNP transistor Q202. The collector of transistor Q202 is connected to ground through a light emitting diode LED 201 and a resistor R206. When an output signal is generated by the counter 238, the transistors Q201, Q202 act as a switch to light the light emitting diode LED 201, thus acting as an output indicator. Again, the output signal from the counter 238 can also be connected to means for compiling data 236, alternatively or in series.

Means for freezing the output indicator when the output indicator has signaled is again provided. Thus, the output signal from the counter 238 is also connected through a resistor R207 in a series with a diode D202 to the base of a grounded emitter NPN transistor Q294. The collector of transistor Q204 is connected to the junction of series resistors R213, R214. In operation, when the counter 238 output signals, the transistor Q204 grounds operational amplifier A201 output, preventing further pulse signals from resetting the counter 238.

The output signal from the counter 238 is also connected through series resistors R208, R209 to the base of a grounded emitter NPN transistor Q203. A capacitor C202 is connected from the junction of the series resistors R208, R209 to ground. The collector of transistor Q203 is connected to the clock input 240 of the counter 238. Thus, an output signal from the counter 238 bias's transistor Q203 which grounds the clock input 240 of the counter 238 to prevent the counter from receiving further timing signals from the clock means 226. With both the clock input 240 and the reset input 242 of counter 238 grounded, light emitting diode LED 201 can only be reset manually and not in response to telephone activity or clock pulses.

The tone control 234, reset means 230 and test means 232 of the second preferred embodiment parallel those of the first preferred embodiment. The tone control 234 is inputted into the telephone line 212 through the input transformer T201 and the tone is overridden via input through a resistor R211 into the transistor Q204 base of the means for freezing the output indicator.

The reset means 230 is as previously a pulse signal inputted into the counter 238 reset input 242. The test means 232 grounds the pulse via input through a diode D203 into the tone control 234 override resistor 211 and speeds the clock means 226 as in the first embodiment.

It should be understood that various modifications, changes and variations may be made in the arrangement, operations and details of construction of the elements disclosed herein without departing from the spirit and scope of the invention.

What is claimed is:

1. A telephone line monitoring device comprising:
   detecting means in communication with the telephone line for detecting activity on the telephone line;
   clock means for signaling the passing of a time interval;
   comparing means in communication with the clock means and the detecting means for determining whether telephone line activity occurred during a predetermined number of time intervals; and
   an output indicator in communication with the comparing means for indicating when the predetermined number of time intervals have passed without telephone line activity.

2. The telephone line monitoring device of claim 1 further including reset means for clearing the comparing means.

3. The telephone line monitoring device of claim 1 further including test means for simulating the passing of the predetermined number of time intervals without telephone line activity.

4. The telephone line monitoring device of claim 3 wherein the test means includes means for disabling the detecting means.

5. The telephone line monitoring device of claim 3 wherein the test means includes a fast counter in communication with the comparing means for reducing the time intervals.

6. The telephone line monitoring device of claim 3 wherein the test means includes means for disabling the detecting means and a fast counter in communication with the comparing means for reducing the time interval for testing.

7. The telephone line monitoring device of claim 1 wherein the detecting means includes input means in communication with a telephone line and a pulse generator in communication with the input means for generating a pulse in response to telephone line activity.

8. The telephone line monitoring device of claim 1 wherein the comparing means includes a counter having a clock input in communication with the clock means for counting a predetermined number of time intervals and a reset input in communication with the detecting means for resetting the counter when telephone line activity occurs.

9. The telephone line monitoring device of claim 1 wherein the detecting means is in communication with a recording machine telephone line for detecting telephone line activity on the recording machine.

10. The telephone line monitoring device of claim 9 further including a tone control for generating an intermittent on-line tone on the telephone line.

11. The telephone line monitoring device of claim 10 further including means for intermittently disabling the detecting means to prevent the on-line tone from resetting the comparing means.

12. The telephone line monitoring device of claim 1 including a plurality of detecting means in communication with respective telephone lines and a plurality of comparing means in communication with respective detecting means wherein the clock means is in communication with the plurality of comparing means to provide multi-telephone line monitoring.

13. The telephone line monitoring device of claim 1 further including means for compiling data in communication with the comparing means.

14. The telephone line monitoring device of claim 1 further including means for freezing the output indicator when the output indicator has indicated that the predetermined number of time intervals have passed without telephone line activity.

15. The telephone line monitoring device of claim 1 wherein the predetermined number of time intervals is two or greater.

16. A telephone line monitoring device comprising:
an input means in communication with a telephone line for receiving telephone line activity signals;
a pulse generator in communication with the input means for generating a pulse in response to telephone line activity;
a clock means for signaling the passage of a time interval;
a counter including a clock input in communication with the clock means for counting time intervals and a reset input in communication with the pulse generator for resetting the counter in response to a pulse from the pulse generator; and
an output indicator in communication with the counter for indicating when the counter has counted at least two time intervals without being reset.

17. The telephone line monitoring device of claim 16 further including reset means for clearing the counter.

18. The telephone line monitoring device of claim 16 further including test means for simulating the passing of the respective number of time intervals without telephone line activity.

19. The telephone line monitoring device of claim 16 wherein the input means is in communication with a recording machine telephone line for detecting telephone line activity on the recording machine.

20. The telephone line monitoring device of claim 19 further including a tone control for generating an intermittent on-line tone on the telephone line.

21. The telephone line monitoring device of claim 15 including a plurality of input means in communication with respective telephone lines, a plurality of pulse generators in communication with respective input means, and a plurality of counters in communication with respective pulse generators and wherein the clock means is in communication with the plurality of counters to provide multi-telephone line monitoring.

22. A method of monitoring whether activity on a telephone line occurred during a predetermined time period comprising the steps of:
(a) detecting whether activity has occurred on the telephone line;
(b) measuring time;
(c) resetting the measurement of time after each telephone line activity is detected; and
(d) signaling if the measurement of time exceeds a predetermined limit.

23. A method of monitoring whether activity on a telephone line occurred during a predetermined time period comprising the steps of:
(a) detecting whether activity has occurred on the telephone line;
(b) generating timing signals to signify the passing of a time interval;
(c) counting the number of timing signals generated;
(d) resetting the count of the number of timing signals after activity has occurred on the telephone line; and
(e) signaling if the count of the number of timing signals exceeds a predetermined limit.

24. The method of monitoring whether activity on a telephone line occurred during a predetermined time period of claim 23 further including the step of detecting whether a plurality of telephone line activity occurred over respective telephone lines to provide multi-telephone line monitoring.

25. A telephone line monitoring device comprising:
detecting means in communication with the telephone line for detecting activity on the telephone line and generating a signal in response to such activity;
measuring means in communication with the detecting means for measuring the passing of a time period, the measuring means restarting its measurement of the timer period when it receives a signal from the detecting means, and generating an output signal if no signal is received from the detecting means before the passage of the time period; and
a tone control in communication with the telephone line for generating an intermittent on-line tone on the telephone line.

* * * * *